(12) United States Patent
Nagaoka et al.

(10) Patent No.: US 10,984,945 B2
(45) Date of Patent: Apr. 20, 2021

(54) TRANSFORMER AND RESONANT CIRCUIT HAVING SAME

(71) Applicant: OMRON Corporation, Kyoto (JP)

(72) Inventors: Shingo Nagaoka, Kizugawa (JP); Toshiyuki Zaitsu, Yokohama (JP); Yutaro Okuno, Kyoto (JP); Sadaharu Morishita, Kizugawa (JP)

(73) Assignee: OMRON Corporation, Kyoto (JP)

( * ) Notice: Subject to any disclaimer, the term of this patent is extended or adjusted under 35 U.S.C. 154(b) by 355 days.

(21) Appl. No.: 15/751,881

(22) PCT Filed: Sep. 30, 2016

(86) PCT No.: PCT/JP2016/078971
§ 371 (c)(1),
(2) Date: Feb. 12, 2018

(87) PCT Pub. No.: WO2017/061329
PCT Pub. Date: Apr. 13, 2017

(65) Prior Publication Data
US 2018/0240588 A1 Aug. 23, 2018

(30) Foreign Application Priority Data
Oct. 5, 2015 (JP) .............................. JP2015-197549

(51) Int. Cl.
*H01F 27/08* (2006.01)
*H01F 38/08* (2006.01)
(Continued)

(52) U.S. Cl.
CPC .............. *H01F 38/08* (2013.01); *H01F 3/12* (2013.01); *H01F 3/14* (2013.01); *H01F 27/24* (2013.01);
(Continued)

(58) Field of Classification Search
USPC ........ 336/165, 182, 178, 188, 184, 220–222
See application file for complete search history.

(56) References Cited

U.S. PATENT DOCUMENTS

| | | |
|---|---|---|
| 4,328,458 A | 5/1982 | Hiromitsu |
| 4,902,942 A | 2/1990 | El-Hamamsy |

(Continued)

FOREIGN PATENT DOCUMENTS

| | | |
|---|---|---|
| CN | 101006533 | 7/2007 |
| CN | 101625923 | 1/2010 |

(Continued)

OTHER PUBLICATIONS

Office Action of China Counterpart Application, with English translation thereof, dated Apr. 19, 2019, pp. 1-10.

(Continued)

*Primary Examiner* — Shawki S Ismail
*Assistant Examiner* — Kazi S Hossain
(74) *Attorney, Agent, or Firm* — JCIPRNET

(57) ABSTRACT

Provided is a transformer (1), which includes: a core (10) which forms a magnetic circuit and has a middle leg (10a) and a plurality of side legs (10b, 10c) branched from the middle leg (10a); primary windings (11) respectively wound around a first winding leg (10a) and a second winding leg (10b), which are selected from the middle leg (10a) and the side legs (10b, 10c); and a secondary winding (12) wound around either of the first winding leg (10a) or the second winding leg (10b), wherein a first magnetic flux generated by the primary windings (11) from the first winding leg (10a) and a second magnetic flux generated by the primary windings (11) from the second winding leg (10b) differ from each other by a predetermined value or more at a position at which the fluxes do not intersect with the secondary winding (12).

16 Claims, 9 Drawing Sheets

(51) Int. Cl.
| | | |
|---|---|---|
| H02M 3/337 | (2006.01) | |
| H01F 27/38 | (2006.01) | |
| H01F 3/12 | (2006.01) | |
| H01F 3/14 | (2006.01) | |
| H01F 27/24 | (2006.01) | |
| H01F 27/28 | (2006.01) | |
| H01F 27/34 | (2006.01) | |
| H02M 1/00 | (2006.01) | |

(52) U.S. Cl.
CPC .......... *H01F 27/28* (2013.01); *H01F 27/346* (2013.01); *H01F 27/38* (2013.01); *H02M 3/337* (2013.01); H02M 2001/0058 (2013.01); H02M 2001/0064 (2013.01)

(56) References Cited

U.S. PATENT DOCUMENTS

| | | | | |
|---|---|---|---|---|
| 5,889,373 | A * | 3/1999 | Fisher | H05B 41/2827 315/278 |
| 2004/0189432 | A1* | 9/2004 | Yan | H01F 37/00 336/182 |
| 2008/0224809 | A1* | 9/2008 | Zhang | H01F 3/12 336/170 |
| 2008/0284550 | A1* | 11/2008 | Shinmen | H01F 29/14 336/155 |
| 2017/0025963 | A1* | 1/2017 | Otake | H02M 1/08 |

FOREIGN PATENT DOCUMENTS

| | | | |
|---|---|---|---|
| CN | 101789637 | | 7/2010 |
| CN | 201611607 | | 10/2010 |
| CN | 201611607 U | * | 10/2010 |
| FR | 1398708 | | 5/1965 |
| GB | 1384950 | | 2/1975 |
| JP | S47-43916 | | 12/1972 |
| JP | H02-32509 | | 2/1990 |
| JP | 2001-237126 | | 8/2001 |
| JP | 2008-166624 | | 7/2008 |
| JP | 2013-172135 | | 9/2013 |
| WO | 20060251556 | | 3/2006 |

OTHER PUBLICATIONS

"Search Report of Europe Counterpart Application", dated May 17, 2019, p. 1-p. 10.

Bo Yang et al., "Integrated magnetic for LLC resonant converter," APEC. Seventeenth Annual IEEE Applied Power Electronics Conference and Exposition, Mar. 10-14, 2002, pp. 346-351.

"International Search Report (Form PCT/ISA/210) of PCT/JP2016/078971", dated Dec. 13, 2016, with English translation thereof, pp. 1-3.

"Written Opinion (Form PCT/ISA/237)", dated Dec. 13, 2016, with English translation thereof, pp. 1-6.

Office Action of China Counterpart Application, with English translation thereof, dated Oct. 31, 2018, pp. 1-13.

* cited by examiner

TRANSFORMER AND RESONANT CIRCUIT HAVING SAME

CROSS-REFERENCE TO RELATED APPLICATION

This application is a 371 application of the international PCT application serial no. PCT/JP2016/078971, filed on Sep. 30, 2016, which claims the priority benefit of Japan application no. 2015-197549, filed on Oct. 5, 2015. The entirety of each of the above-mentioned patent applications is hereby incorporated by reference herein and made a part of this specification.

TECHNICAL FIELD

The present invention relates to a small transformer (a transformer) having a high leakage inductance used in a resonant circuit, and a resonant circuit having the same.

BACKGROUND ART

Conventionally, a resonant circuit realizes soft switching using the resonance of a resonant inductance Lr and a resonant capacitor Cr. A leakage inductance of a transformer can be used in the resonant inductance Lr. It is known that, with use of the leakage inductance, the number of parts is reduced, and noise can be reduced.

However, when a transformer is made smaller, there is a problem that it is difficult to maintain a sufficient interval between a primary winding and a secondary winding for making leakage inductance, and a leakage inductance required for resonance may not be obtained.

Thus, to obtain a high leakage inductance, a method using a bobbin that separates a primary winding from a secondary winding has been proposed (e.g., see Patent Literature 1).

However, to obtain a sufficient leakage inductance, it is necessary to increase a separation distance between the primary winding and the secondary winding, and the transformer is made larger.

To increase the leakage inductance of the transformer, a method of generating a leakage magnetic field to obtain a high leakage inductance by adding a magnet between the primary winding and the secondary winding has also been proposed (e.g., see Patent Literature 2).

However, the leakage magnetic field from the added magnet intersects with the surrounding windings, and thereby a loss is increased. Since the magnet is additionally required, there are more members.

A method for obtaining a leakage inductance by winding a secondary winding around a middle leg portion around which a primary winding is wound and side legs around which the primary winding is not wound has been proposed (e.g., see Patent Literature 3).

However, in the method in which the primary winding is wound around the middle leg portion alone, the number of layers of the primary winding is increased, and efficiency is reduced by a proximity effect.

CITATION LIST

Patent Literature

[Patent Literature 1]
Japanese Unexamined Patent Application Publication No. 2001-237126

[Patent Literature 2]
Japanese Unexamined Patent Application Publication No. 2013-172135

[Patent Literature 3]
Japanese Unexamined Patent Application Publication No. 2008-166624

SUMMARY OF INVENTION

Technical Problem

In view of these problems of the related art, an object of the present invention is to provide a transformer that obtains a high leakage inductance by generating magnetic fluxes having a sufficient difference in magnitude at two positions in a core due to primary windings, and a resonant circuit having this transformer.

Solution to Problem

To achieve the above object, a transformer of the present invention is characterized in including: a core configured to form a magnetic circuit and have a middle leg and a plurality of side legs branching off from the middle leg; primary windings respectively wound around a first winding leg and a second winding leg, which are selected from the middle leg and the plurality of side legs; and a secondary winding wound around either of the first winding leg or the second winding leg. A first magnetic flux generated by the primary windings from the first winding leg and a second magnetic flux generated by the primary windings from the second winding leg differ from each other by a predetermined value or more at a position at which the fluxes do not intersect with the secondary winding.

Here, the core has a path of the magnetic flux, which does not intersect with the secondary winding, of the first magnetic flux and the second magnetic flux which are generated by the primary windings. Further, a gap may be provided in the path.

According to the transformer having this configuration, a small transformer in which an additional member is not required, a loss caused by an influence of a leakage magnetic field or a proximity effect is not also increased, and a high leakage inductance is obtained can be realized. When the gap is provided in the path, the leakage inductance can be arbitrarily adjusted by a length of this gap.

In the transformer of the present invention, to give a difference to magnitudes of the first magnetic flux and the second magnetic flux, for example, at least one of a cross-sectional area or the number of turns of the primary winding may differ at the first winding leg and the second winding leg. Alternatively, a gap may be provided in either the first winding leg or the second winding leg, or gaps having different lengths may be respectively provided in the first winding leg and the second winding leg. However, the present invention is not limited to this method.

A resonant circuit of the present invention is characterized in including: the transformer, a resonant inductance, and a resonant capacitor, the resonant circuit uses resonance of the resonant inductance and the resonant capacitor connected to an excitation inductance of the transformer. The resonant inductance and the resonant capacitor may be connected in series to the excitation inductance.

According to the resonant circuit having this configuration, a resonant converter or a series resonant converter in which a ratio ($I=Lm/Lr$) between the excitation inductance ($Lm$) and the resonant inductance ($Lr$) is small can be configured. Since a frequency characteristic is sharp, a wide range of output voltage can be obtained by changing a switching frequency or, when the output voltage is constantly controlled, an input range can be widened by changing a switching frequency.

When the resonant circuit of the present invention is an LLC type resonant circuit, a ratio between the excitation inductance and the resonant inductance is preferably less than or equal to 3.

Advantageous Effects of Invention

According to the transformer of the present invention, a small transformer in which an additional member is not required, a loss caused by an influence of a leakage magnetic field or a proximity effect is not also increased, and a high leakage inductance is obtained can be realized.

According to the resonant circuit having the transformer of the present invention, a series resonant converter in which a ratio (I=Lm/Lr) between the excitation inductance (Lm) and the resonant inductance (Lr) is small can be configured. Since a frequency characteristic is sharp, a wide range of output voltage can be obtained by changing a switching frequency or, when the output voltage is constantly controlled, an input range can be widened by changing a switching frequency.

DESCRIPTION OF EMBODIMENTS

Hereinafter, several embodiments of the present invention will be described on the basis of the drawings.

First Embodiment

Figure 1:
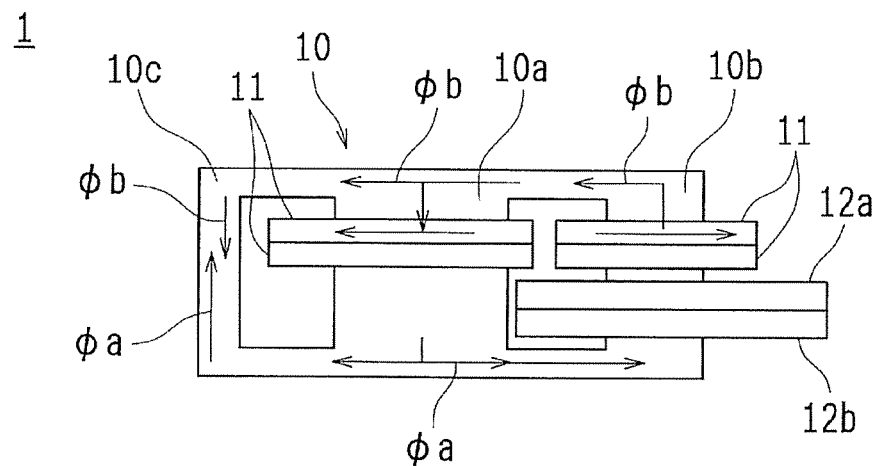
FIG. 1 is an overview configuration diagram of a transformer 1 according to a first embodiment of the present invention.
Figure 2A:
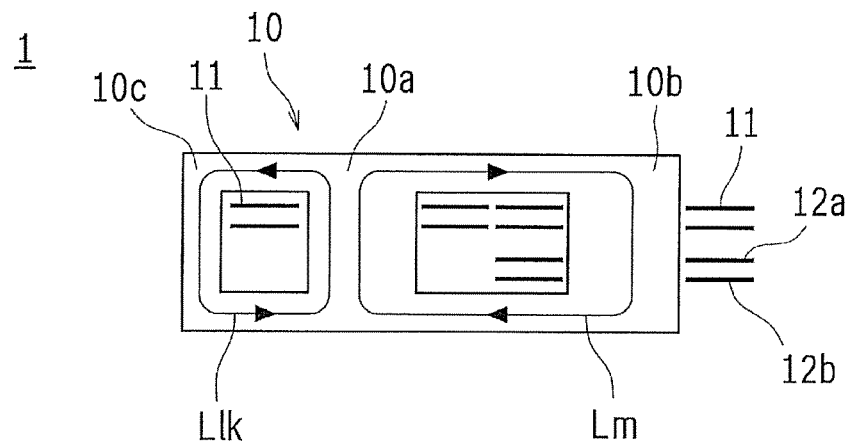
FIG. 2(a) is a schematic explanatory diagram of an excitation inductance Lm and a leakage inductance Llk in the transformer 1.
Figure 2B:
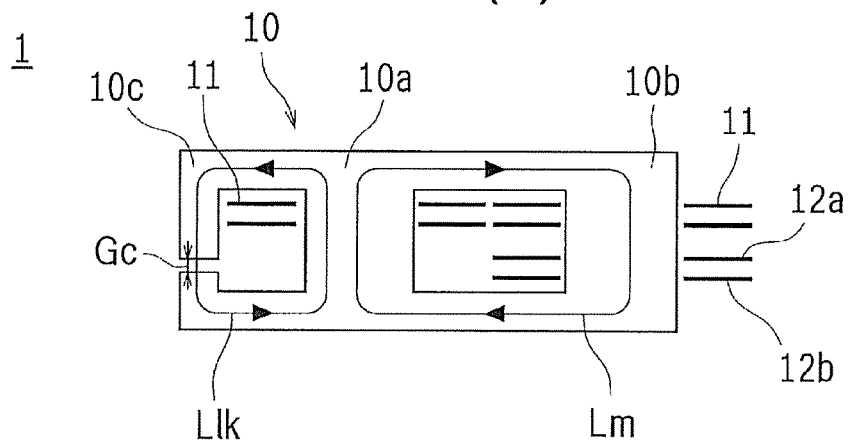
FIG. 2(b) is a schematic explanatory diagram of an example in which a gap is provided in a left leg 10c of a core 10 of the transformer 1.

FIG. 1 is an overview configuration diagram of a transformer 1 according to a first embodiment of the present invention. FIG. 2(a) is a schematic explanatory diagram of an excitation inductance Lm and a leakage inductance Llk in the transformer 1. FIG. 2(b) is a schematic explanatory diagram of an example in which a gap is provided in a left leg 10c of a core 10 of the transformer 1.

As illustrated in FIG. 1, the transformer 1 includes a core 10 that forms a magnetic circuit, primary windings 11 that are input sides, and a secondary first winding 12a and a secondary second winding 12b (referred to collectively as a secondary winding 12) that are output sides. Here, a case in which a center tap is removed from the secondary winding 12 is shown, but if the center tap is not removed, only one of the secondary first winding 12a and the secondary second winding 12b may be used.

The core 10 has one middle leg 10a and side legs 10b and 10c branching off into two from the middle leg 10a (distinguished by being called a right leg 10b and a left leg 10c as needed), and is made up of, for instance, an E type core and an I type core, or E type cores, or the like. A material of the core 10 may be a typical material.

The primary windings 11 are wound around two legs that are arbitrarily selected from the middle leg 10a and the side legs 10b and 10c (which are a "first winding leg" and a "second winding leg" in this application, and the middle leg 10a and the right leg 10b herein) with winding directions (indicated by arrows superimposed on the primary windings 11 in the figure) opposite to each other. Hereinafter, the case in which the middle leg 10a and the right leg 10b are selected will be described by way of example. However, a combination of the two legs may be the left leg 10c and the middle leg 10a, or the left leg 10c and the right leg 10b.

The secondary winding 12 is wound around any one of the selected two legs, that is, the middle leg 10a and the right leg 10b (here, the right leg 10b).

For the primary windings 11 and the secondary winding 12, for instance a PCB board on which a pattern is formed (a pattern coil), an edgewise coil, or a copper foil may be used as a wire, in addition to a litz wire obtained by twisting fine wires and a single wire, but the present invention is not limited thereto. When the wire is used, the bobbin may be used together.

In the configuration of this transformer 1, as illustrated in FIG. 2(a), if magnetic fluxes Φa and Φb are generated at the two legs (here, the middle leg 10a and the right leg 10b) around which the primary windings 11 are wound, and a sufficient difference (a difference that is greater than or equal to a predetermined given value) in the magnitudes of the magnetic fluxes Φa and Φb is present at positions at which the magnetic fluxes do not intersect with the secondary winding 12, the secondary winding 12 is wound around only one of the middle leg 10a and the right leg 10b, and the core 10 has a path (the left leg 10c) flowing the leakage inductance Llk. Thus, a high leakage inductance Llk can be obtained.

As illustrated in FIG. 2(b), when a gap is provided in the path flowing the leakage inductance Llk in the core 10 of the transformer 1, the leakage inductance Llk can be arbitrarily adjusted by a length Gc of this gap.

Figure 3:
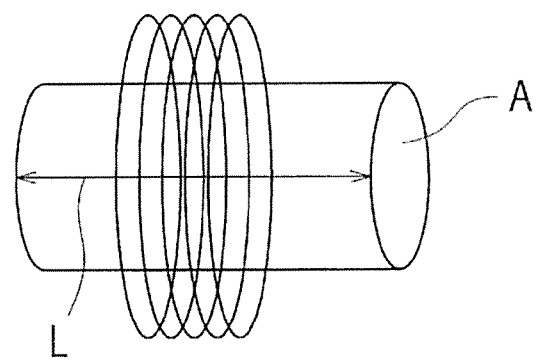
FIG. 3 is an explanatory diagram of parameters relevant to permeance P used in a magnetic circuit calculation.

FIG. 3 is an explanatory diagram of parameters relevant to permeance P used in magnetic circuit calculation.

Next, an example of a method for giving a difference to the magnitudes of the generated magnetic fluxes will be described, but a basis of the magnetic circuit calculation is checked first. Total magnetic flux Φ, a magnetomotive force F, and magnetic resistance R has a relation of the following formula.

$$\text{Total magnetic flux } \Phi = \text{Magnetomotive force } F/\text{Magnetic resistance } R \quad (1)$$

However, in the magnetic circuit calculation, since the magnetic resistance R is seldom used, and the permeance P that is a reciprocal of the magnetic resistance R is generally used, the following formula can be substituted for formula (1).

$$\text{Total magnetic flux } \Phi = \text{Magnetomotive force } F \cdot \text{Permeance } P \quad (2)$$

As illustrated in FIG. 3, this permeance P is expressed by the following formula when a magnetic path length is defined as L, a magnetic path cross-sectional area is defined as A, and permeability is defined as μ.

$$\text{Penneance } P = \text{Permeability } \mu \cdot \text{Magnetic path cross-sectional area } A/\text{Magnetic path length } L \quad (3)$$

Figure 4:
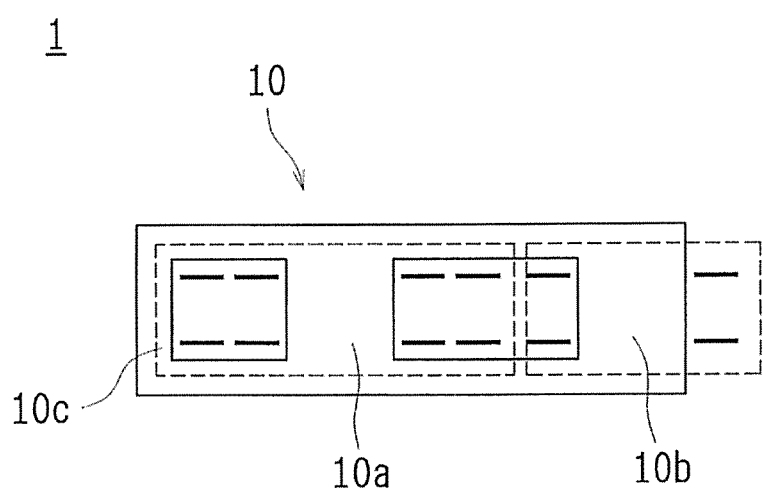
FIG. 4 is a schematic explanatory diagram of a method for giving a difference to a magnetomotive force F in the transformer 1.
Figure 5A:
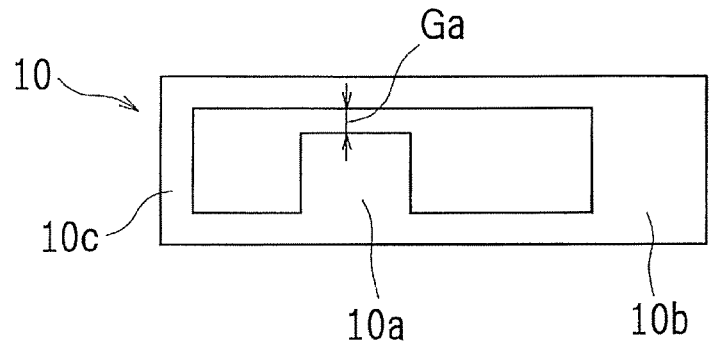
FIG. 5(a) to FIG. 5(c) are schematic explanatory diagrams of a method for giving a difference to magnetic resistance R in the transformer 1.
Figure 5B:
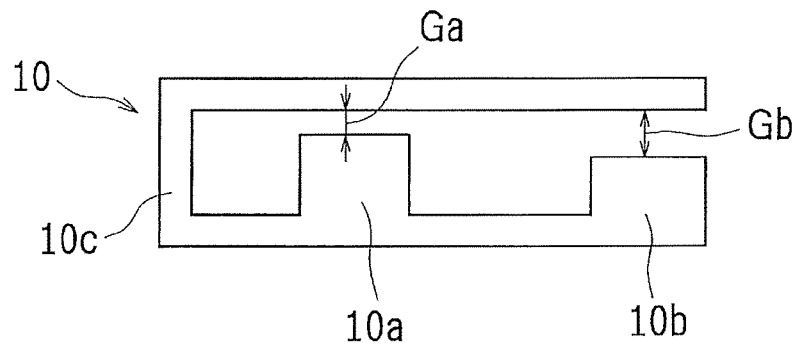
Figure 5C:
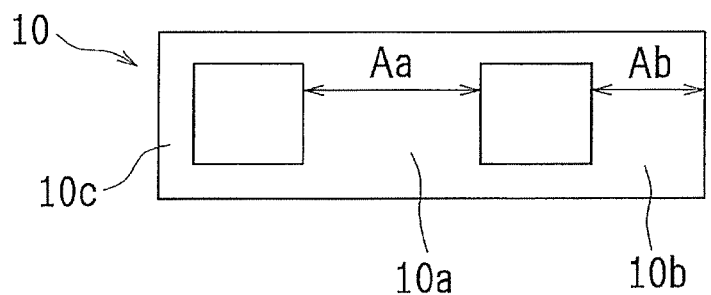

FIG. 4 is a schematic explanatory diagram of a method for giving a difference to a magnetomotive force F in the transformer 1. FIG. 5(a) to FIG. 5(c) are schematic explanatory diagrams of a method for giving a difference to magnetic resistance R in the transformer 1.

As an example of the method for giving the difference to the magnitudes of the generated magnetic fluxes, a difference may be given to magnetomotive forces F of the middle leg 10a and the right leg 10b of the transformer 1.

Since the magnetomotive force F is expressed by the following formula, it is considered, for instance, to make the middle leg 10a and the right leg 10b different in the number of turns N from each other as illustrated in FIG. 4.

Magnetomotive force F∝NI (where I is constant, and N is the number of turns of the coil)

As another example of the method for giving the difference to the magnitudes of the generated magnetic fluxes, a difference may be given to the magnetic resistance R of each of the portions around which the primary windings 11 are wound in the core 10 of the transformer 1, particularly the middle leg 10a and the right leg 10b here.

As can be seen from formula (3) above, since the permeability μ, the magnetic path cross-sectional area A, and the magnetic path length L are relevant to the permeance P (the reciprocal of the magnetic resistance R), at least one of these parameters needs only to be changed.

For example, as illustrated in FIG. 5(a), a gap may be provided for at least one of the middle leg 10a and the right leg 10b, or illustrated in FIG. 5(b), when the gap is provided for both of them, a length of each gap may be changed. Since the gap portion and the core 10 are different in permeability μ from each other, the permeability μ at large is changed depending on the length of the gap. The gap is not necessarily provided at an upper side of the core 10 as illustrated in FIG. 5(a) and FIG. 5(b), and it may be provided for each of the middle leg 10a and the right leg 10b.

As illustrated in FIG. 5(c), magnetic path cross-sectional areas Aa and Ab of the middle leg 10a and the right leg 10b may be made different from each other. However, the present invention is not limited to these methods.

According to the first embodiment described above, the small transformer in which an additional member such as a magnet is not required, a loss caused when a leakage magnetic field intersects with its surrounding windings is not also increased, a reduction in efficiency caused by a proximity effect generated when the number of layers of the primary winding is increased is not also incurred, and a high leakage inductance is obtained can be realized.

Modification of the First Embodiment

Figure 6A:
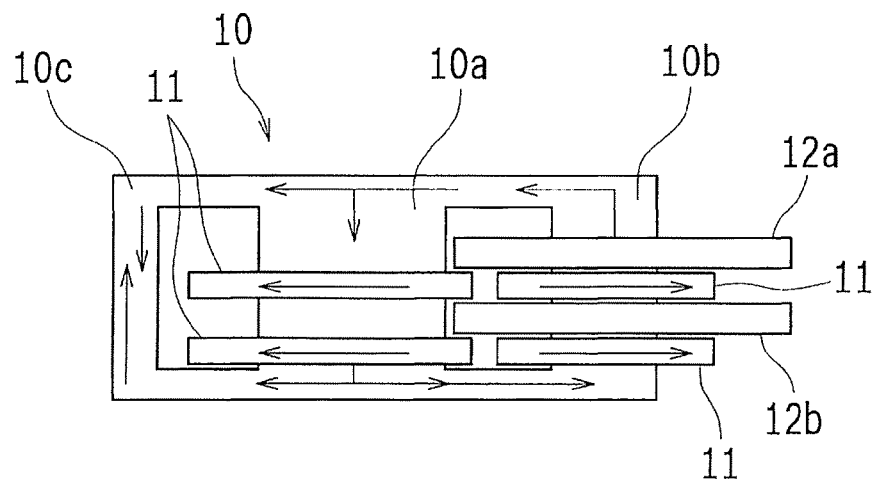
FIG. 6(a) and FIG. 6(b) are schematic diagrams illustrating other winding methods of primary windings 11 and a secondary winding 12 (12a and 12b).
Figure 6B:
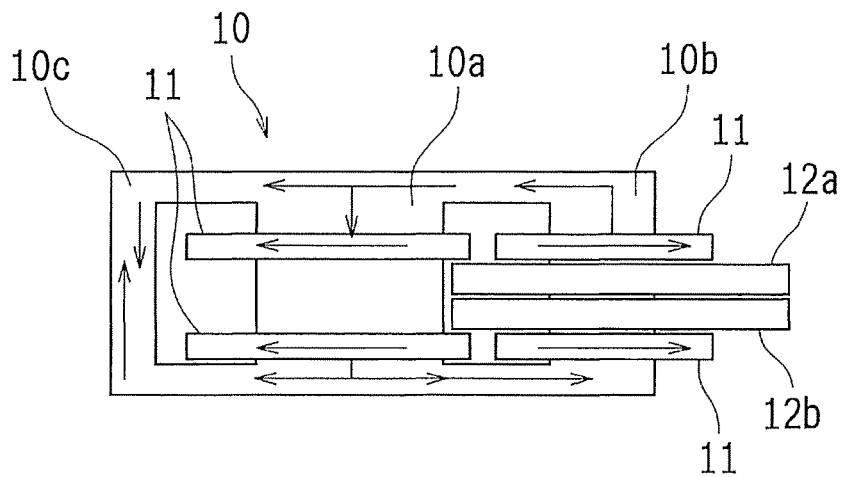
Figure 7A:
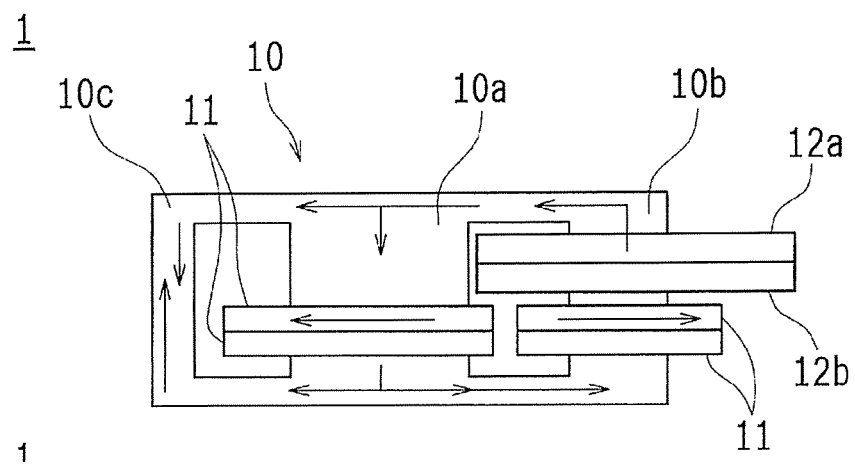
FIG. 7(a) to FIG. 7(c) are schematic diagrams illustrating still other winding methods of the primary windings 11 and the secondary winding 12 (12a and 12b).
Figure 7B:
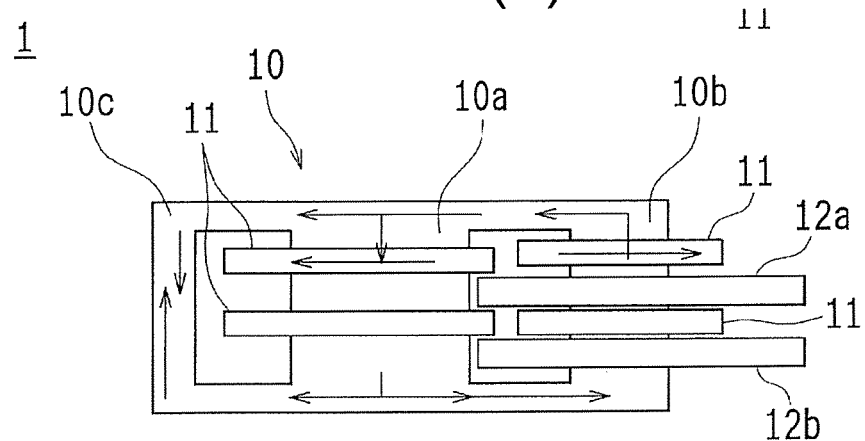
Figure 7C:
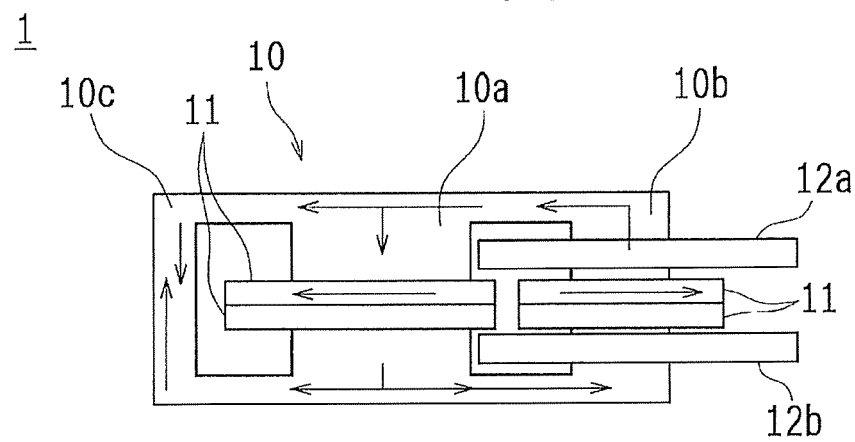

FIG. 6(a) and FIG. 6(b) are schematic diagrams illustrating other winding methods of the primary windings 11 and the secondary winding 12 (12a and 12b). FIG. 7(a) to FIG. 7(c) are schematic diagrams illustrating still other winding methods of the primary windings 11 and the secondary winding 12 (12a and 12b).

In the aforementioned first embodiment, the primary windings 11 are wound around the middle leg 10a and the right leg 10b with the winding directions opposite to each other. The secondary winding 12 (the secondary first winding 12a and the secondary second winding 12b) is wound around the right leg 10b below the primary windings 11. However, the winding methods of the primary windings 11 and the secondary winding 12 are not limited thereto.

For example, as illustrated in FIG. 6(a), the primary windings 11 and the secondary winding 12 may be alternately wound. Alternatively, as illustrated in FIG. 6(b), the primary winding 11, the secondary winding 12 (the secondary first winding 12a), the secondary winding 12 (the secondary second winding 12b), and the primary winding 11 may be wound from above in this order.

The winding methods of the primary windings 11 and the secondary winding 12 in the first embodiment may be turned upside down as illustrated in FIG. 7(a). The winding methods illustrated in FIG. 6(a) may also be turned upside down as illustrated in FIG. 7(b). Likewise, the winding methods illustrated in FIG. 6(b) may also be turned upside down as illustrated in FIG. 7(c).

Second Embodiment

Figure 8:
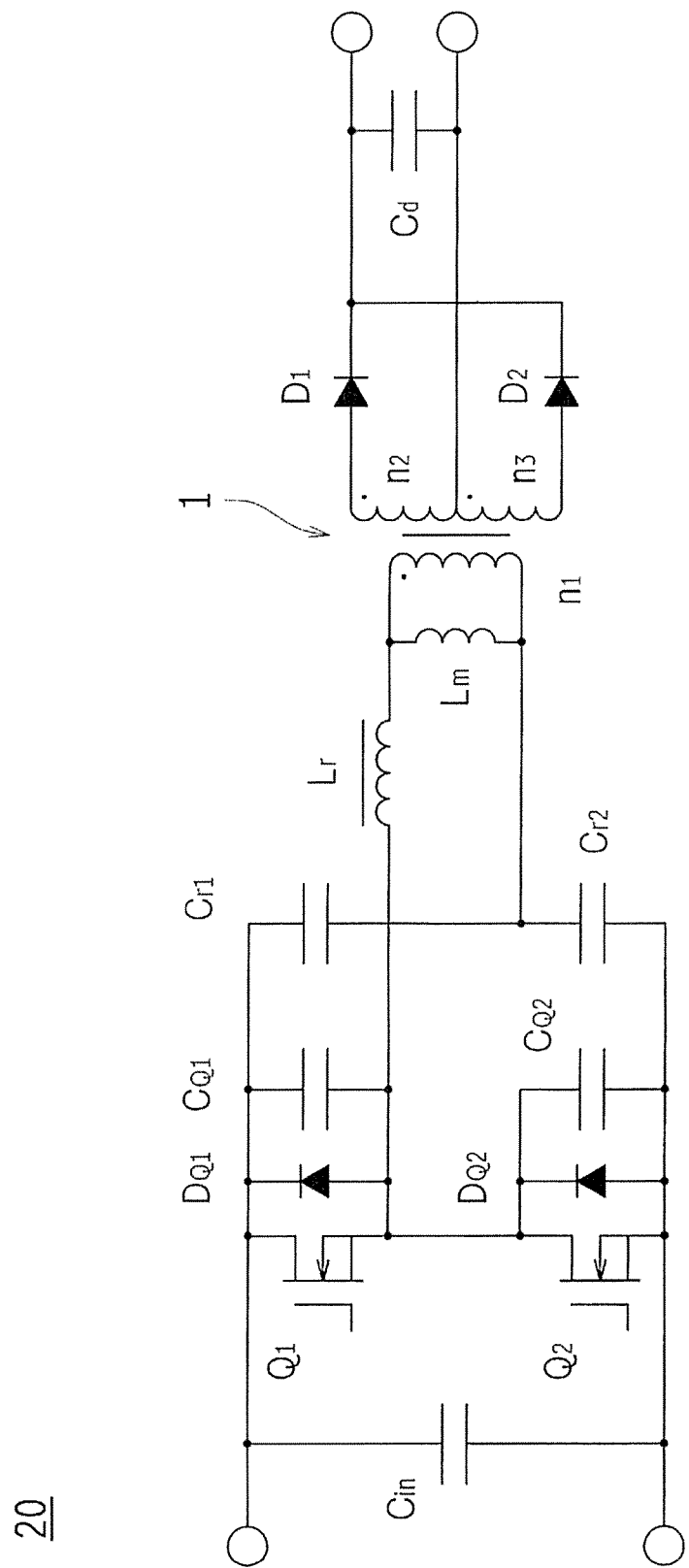
FIG. 8 is an overview configuration diagram of a series resonant converter circuit 20 according to a second embodiment of the present invention.

FIG. 8 is an overview configuration diagram of a half bridge type series resonant converter circuit 20 according to a second embodiment of the present invention.

The transformer 1 of the aforementioned first embodiment is suitable for, for instance, series resonant converter circuits of a half bridge and a full bridge, a phase shift full bridge circuit, a dual active bridge (DAB) circuit, or the like.

It can be used in a resonant circuit that uses the resonance of a resonant inductance Lr and a resonant capacitor Cr which are connected in series to an excitation inductance of the transformer 1. An example of the resonant circuit is the half bridge type series resonant converter circuit 20 illustrated in FIG. 8. The half bridge type series resonant converter circuit 20 includes a capacitor $C_{in}$, a capacitor $C_{Q1}$, a capacitor $C_{r1}$ capacitor $C_{Q2}$, a capacitor $C_{r2}$, a capacitor $C_d$, a transistor $Q_1$, a transistor $Q_2$, a diode $D_{Q1}$ a diode $D_{Q2}$, a diode $D_1$, a diode $D_2$, a primary winding $n_1$, a secondary winding $n_2$ and a secondary winding $n_3$.

According to this second embodiment, the transformer 1 of the first embodiment which has a high leakage inductance is used, and thereby a series resonant converter in which a ratio (I=Lm/Lr) between the excitation inductance Lm and the resonant inductance Lr is small can be configured. Since a frequency characteristic is sharp, a wide range of output voltage can be obtained by changing a switching frequency or, when the output voltage is constantly controlled, an input range can be widened by changing a switching frequency.

In the case of an LLC circuit, it is preferably configured such that the ratio (I=Lm/Lr) between the excitation inductance Lm and the resonant inductance Lr is less than or equal to 3.

First Example

Figure 9:
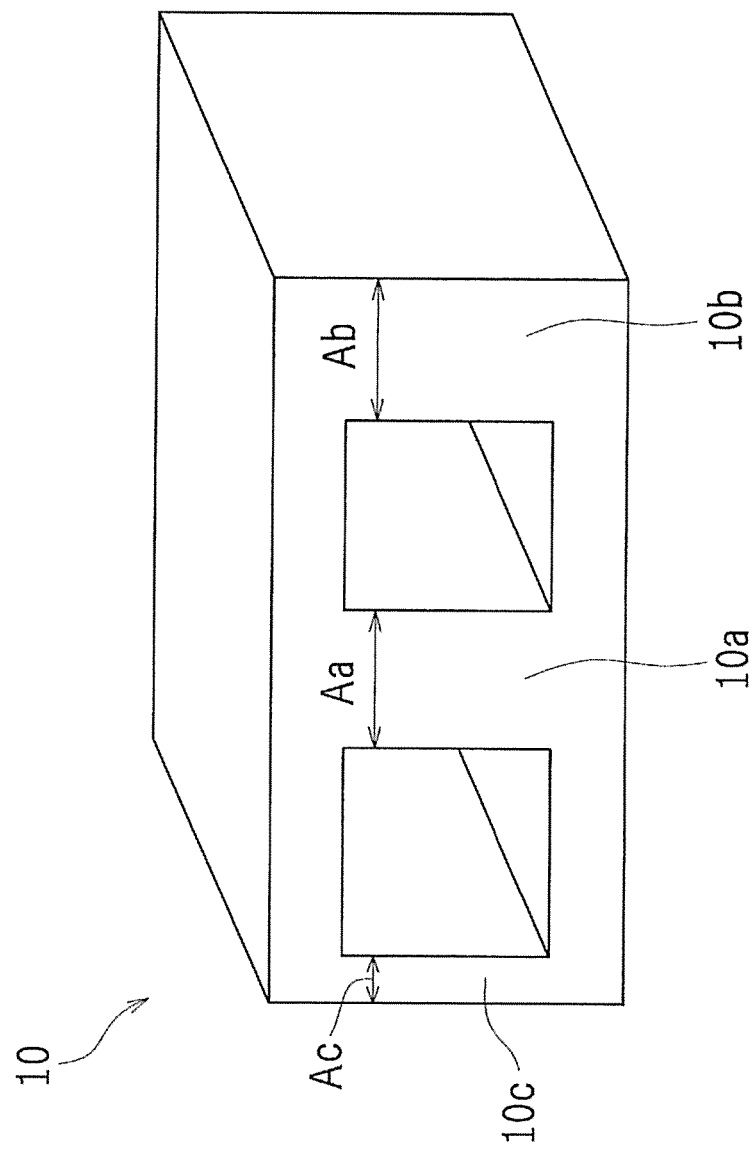
FIG. 9 is an overview configuration diagram of a core 10 of a first example of the first embodiment of the present invention.

FIG. 9 is an overview configuration diagram of a core 10 of a first example of the first embodiment of the present invention. In the first example, as illustrated in FIG. 9, a core 10 was used in which a cross-sectional area Ac of the left leg 10c for a leakage inductance path was set to 1, a cross-sectional area Aa of the middle leg 10a was set to 2, and a cross-sectional area Ab of the right leg 10b was set to 2.

The primary winding 11 was alternately wound around the middle leg 10a and the right leg 10b of the core 10 in the number 8 by two turns for the middle leg and one turn for the right leg for a total of 15 turns (ten turns of the middle leg and five turns for the right leg), and finally one turn for the right leg.

Further, the secondary winding 12 was wound around the right leg 10b of the core 10 in the same direction as the primary winding 11 by two turns, and aside from this, the secondary winding 12 was wound around the right leg 10b in the direction opposite to the direction of the primary winding 11 by two turns.

Measurement was performed using an LCR meter. A measurement condition was a frequency of 100 kHz. First, the secondary winding 12 was opened, and an inductance value Lp of the primary winding 11 was measured. Next, the secondary winding 12 was shorted, and the inductance Llk of the primary winding 11 was measured.

This inductance Llk was a leakage inductance, and the excitation inductance Lm was given by Lm=Lp−Llk. When m=Lm/Llk, measured results were as follows.

Lm=157.2 μH
Llk=104.1 μH
m≈1.5

A high leakage inductance was obtained.

Second Example

Figure 10:
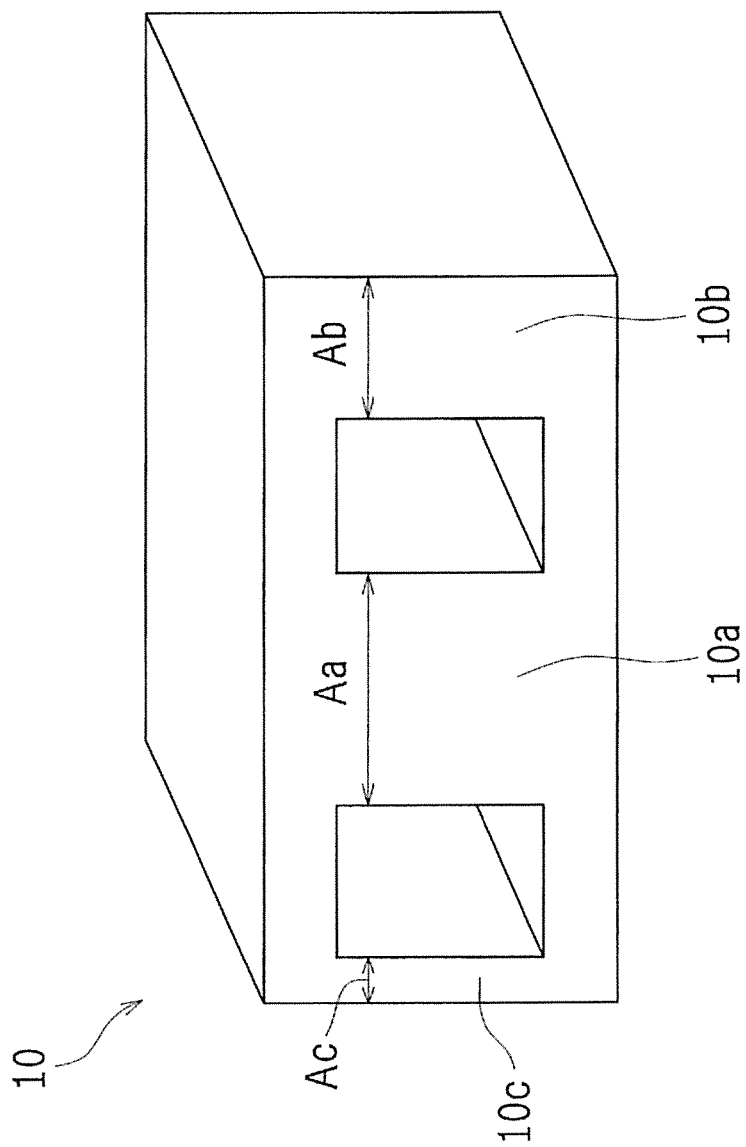
FIG. 10 is an overview configuration diagram of a core 10 of a second example of the first embodiment of the present invention.

FIG. 10 is an overview configuration diagram of a core 10 of a second example of the first embodiment of the present invention. In the second example, as illustrated in FIG. 10, a core 10 was used in which a cross-sectional area Ac of the left leg 10c for a leakage inductance path was set to 1, a cross-sectional area Aa of the middle leg 10a was set to 3, and a cross-sectional area Ab of the right leg 10b was set to 2.

The primary winding 11 was alternately wound around the middle leg 10a and the right leg 10b of the core 10 in the number 8 by one turn after another for a total of 16 turns (eight turns of the middle leg and eight turns for the right leg).

Further, the secondary winding 12 was wound around the right leg 10b of the core 10 in the same direction as the primary winding 11 by two turns, and aside from this, the secondary winding 12 was wound around the right leg 10b in the direction opposite to the direction of the primary winding 11 by two turns.

A measurement device, a measurement condition, and a measuring method were the same as in the first example. Measured results were as follows.

Lm=227 μH
Llk=89.8 μH
m≈3.1

A high leakage inductance was also obtained.

Third Example

Figure 11:
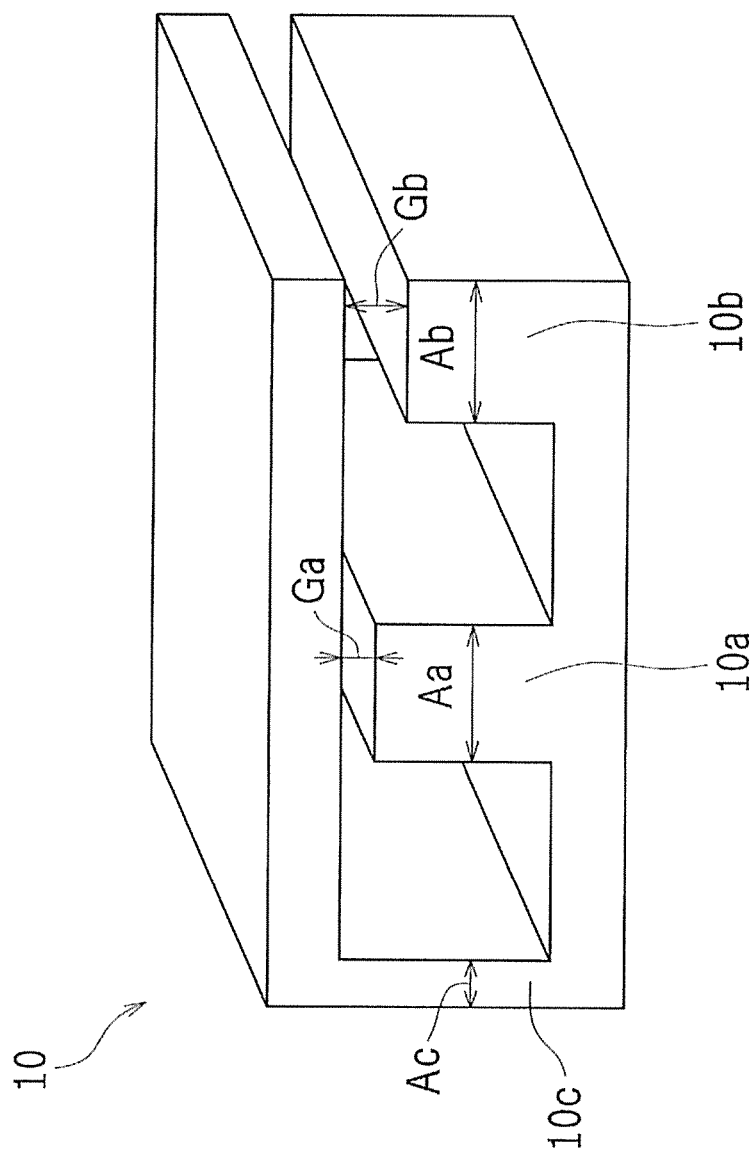
FIG. 11 is an overview configuration diagram of a core 10 of a third example of the first embodiment of the present invention.

FIG. 11 is an overview configuration diagram of a core 10 of a third example of the first embodiment of the present invention. In the third example, as illustrated in FIG. 11, a core 10 was used in which a cross-sectional area Ac of the left leg 10c for a leakage inductance path was set to 1, a cross-sectional area Aa of the middle leg 10a was set to 2, and a cross-sectional area Ab of the right leg 10b was set to 2, and in which a length Ga of the gap of the middle leg 10a was set to 1, and a length Gb of the gap of the right leg 10b was set to 2.

The primary winding 11 was alternately wound around the middle leg 10a and the right leg 10b of the core 10 in the number 8 by one turn after another for a total of 16 turns (eight turns of the middle leg and eight turns for the right leg).

Further, the secondary winding 12 was wound around the right leg 10b of the core 10 in the same direction as the primary winding 11 by two turns, and aside from this, the secondary winding 12 was wound around the right leg 10b in the direction opposite to the direction of the primary winding 11 by two turns.

A measurement device, a measurement condition, and a measuring method were the same as in the first example. Measured results were as follows.

Lm=27.2 μH
Llk=80.4 μH
m≈0.89

A high leakage inductance was also obtained.

The configurations of the first embodiment, its modification, the second embodiment, and the first to third examples which are described above may be combined with one another as long as obstructive factors or the like are not especially present.

The present invention can be carried out in various other modes without departing from the gist or the principal features thereof. For this reason, the aforementioned embodiments and examples are merely simple examples in every respect, and are not to be restrictively interpreted. The scope of the present invention is defined by the claims, and is not restricted at all by the text of the specification. Further, all alterations or modifications belonging to the equivalent scope of the claims are within the scope of the present invention.

The invention claimed is:

1. A transformer, characterized in comprising:
a core configured to form a magnetic circuit and have a middle leg and a plurality of side legs branching off from the middle leg;
primary windings respectively wound around the middle leg and one of the side legs, wherein winding direction of the primary winding wound around the middle leg and winding direction of the primary winding wound around the one of the side legs are opposite to each other; and
a secondary winding wound around the one of the side legs,
wherein a first magnetic flux generated by the primary windings from the middle leg and a second magnetic flux generated by the primary windings from the one of the side legs differ from each other by a predetermined value or more at a position at which the fluxes do not intersect with the secondary winding,
wherein a cross-sectional area of the primary winding differs at the middle leg and the one of the side legs.

2. The transformer according to claim 1, characterized in that the core has a path of the magnetic flux, which does not intersect with the secondary winding, of the first magnetic flux and the second magnetic flux which are generated by the primary windings.

3. The transformer according to claim 2, characterized in that a gap is provided in the path.

4. The transformer according to claim 1, characterized in that the number of turns of the primary winding differs at the middle leg and the one of the side legs.

5. The transformer according to claim 1, characterized in that a gap is provided in either the middle leg or the one of the side legs, or gaps having different lengths are respectively provided in the middle leg and the one of the side legs.

6. A resonant circuit, characterized in comprising:
the transformer according to claim 1;
a resonant inductance; and
a resonant capacitor,
wherein the resonant circuit uses resonance of the resonant inductance and the resonant capacitor connected to an excitation inductance of the transformer.

7. The resonant circuit according to claim 6, characterized in that the resonant inductance and the resonant capacitor are connected in series to the excitation inductance.

8. The resonant circuit according to claim 7, characterized in that:
the resonant circuit is an LLC type resonant circuit; and
the excitation inductance/the resonant inductance ≤3.

9. The transformer according to claim 2, characterized in that the number of turns of the primary winding differs at the middle leg and the one of the side legs.

10. The transformer according to claim 3, characterized in that the number of turns of the primary winding differs at the middle leg and the one of the side legs.

11. The transformer according to claim 2, characterized in that a gap is provided in either the middle leg or the one of the side legs, or gaps having different lengths are respectively provided in the middle leg and the one of the side legs.

12. The transformer according to claim 3, characterized in that a gap is provided in either the middle leg or the one of the side legs, or gaps having different lengths are respectively provided in the middle leg and the one of the side legs.

13. The transformer according to claim 4, characterized in that a gap is provided in either the middle leg or the one of the side legs, or gaps having different lengths are respectively provided in the middle leg and the one of the side legs.

14. A resonant circuit, characterized in comprising:
the transformer according to claim 2;
a resonant inductance; and
a resonant capacitor,
wherein the resonant circuit uses resonance of the resonant inductance and the resonant capacitor connected to an excitation inductance of the transformer.

15. The resonant circuit according to claim 14, characterized in that the resonant inductance and the resonant capacitor are connected in series to the excitation inductance.

16. The resonant circuit according to claim 15, characterized in that:
the resonant circuit is an LLC type resonant circuit; and
a ratio between the excitation inductance and the resonant inductance is less than or equal to 3.

* * * * *